United States Patent [19]

Jörg et al.

[11] Patent Number: 4,736,510

[45] Date of Patent: Apr. 12, 1988

[54] PROCESS OF PRODUCING A RESILIENT COUPLING AND A PRODUCT THEREOF

[75] Inventors: Benno M. Jörg, Weinheim; Klaus Kurr, Weinheim-Hohensachsen; Georg Schäfer, Weinheim; Heinz Seifert, Laudenbach, all of Fed. Rep. of Germany

[73] Assignee: Firma Carl Freudenberg, Weinheim/Bergstr., Fed. Rep. of Germany

[21] Appl. No.: 940,174

[22] Filed: Dec. 10, 1986

Related U.S. Application Data

[63] Continuation of Ser. No. 651,934, Sep. 18, 1984, abandoned.

[30] Foreign Application Priority Data

Sep. 24, 1983 [DE] Fed. Rep. of Germany ....... 3334630

[51] Int. Cl.$^4$ .................... B23P 25/00; B29C 39/10
[52] U.S. Cl. .................... 29/436; 29/455 R; 29/460; 29/469.5; 29/527.3; 74/574; 264/130; 264/242; 264/261; 264/264; 264/265; 267/141.5

[58] Field of Search ............... 264/130, 242, 261, 264, 264/265; 29/436, 455 R, 460, 469.5, 527.2, 527.3; 74/574; 248/560, 562, 637; 267/140.1, 141.5; 403/267, 268, 269

[56] References Cited

U.S. PATENT DOCUMENTS

| | | | |
|---|---|---|---|
| 2,538,658 | 1/1951 | Saurer | 264/264 X |
| 3,051,607 | 8/1962 | Werth | 264/264 X |
| 3,090,108 | 5/1963 | Gifford | 264/264 X |
| 3,471,178 | 10/1969 | Roe | 264/130 X |
| 4,237,086 | 12/1980 | Gehle | 264/130 |
| 4,263,237 | 4/1981 | Weeden et al. | 264/130 X |
| 4,489,018 | 12/1984 | Ball | 264/130 X |

Primary Examiner—Jeffery Thurlow
Assistant Examiner—Leo B. Tentoni
Attorney, Agent, or Firm—Felfe & Lynch

[57] ABSTRACT

A process of producing a resilient coupling in a clearance space between two, relatively-movable elements with a polymeric material introduces the polymeric material contactingly into a clearance space between the elements. A portion of the polymeric material is softened at least while in contact with the clearance-space surface for adhesion when solidified thereafter into a resilient body for the coupling, but a portion of the clearance-space surface is arranged to prevent adhesion. The combination provides coupling with guidance of the relative motion.

9 Claims, 1 Drawing Sheet

PROCESS OF PRODUCING A RESILIENT COUPLING AND A PRODUCT THEREOF

This application is a continuation of application Ser. No. 651,934, filed Sept. 18, 1984 now abandoned.

BACKGROUND OF THE INVENTION

The invention relates to a process of producing a resilient coupling between relatively movable elements and a coupled product thereof.

A process of producing a resilient coupling in a torsion-vibration damper is disclosed in U.S. Pat. No. 3,823,619. In it, fluid material for a resilient coupling between elements (machine parts) is introduced into a clearance space between the elements. The clearance space serves as a forming die for the material and, as the material solidifies to form a resilient body, it bonds to the elements over the entire die-space contact surfaces to form the resilient coupling between the elements. As a result, the resilient body undergoes deformation over its entire cross-sectional area even when the elements are relatively displaced only slightly. Especially when a soft-elastic material has been used as the resilient body, however, this may give rise to guidance problems, for example when the machine parts move relative to each other in a direction parallel to the clearance.

German patent publication DAS No. 26 18 333 relates to an engine mount produced, in part, in the same way. Here, however, machine parts movable relative to each other serve as only part of a forming die to be firmly bonded to resilient material as it solidifies therein into a resilient, coupling body. Wall portions which seal the forming die space in the other areas are then removed and replaced with further machine parts which are attached to one of the die-forming machine parts for movement therewith. As a result, the further machine parts are separate from the resilient body. This fosters good guidance of the relative motion of the machine parts. However, replacing the die-sealing wall portions with the further machine parts adds to the production costs.

SUMMARY OF THE INVENTION

An object of the invention is to improve the processes outlined above in a way, comparatively, to achieve better guidance of elements resiliently coupled for movement relative to each other in the process and/or reduce production costs.

In accordance with the invention, this and other objects are achieved by providing two, relatively-movable elements (machine parts) to be resiliently coupled with surfaces which, when the elements are suitably oriented relative to each other, will form at least part of a clearance space between the elements. At least a portion of the clearance-space surface of at least one element is arranged to prevent adhesion of a softened polymeric material when solidified to form a resilient body for resiliently coupling the elements. The adhesion-preventing arrangement may be accomplished before or after orienting the elements for forming the clearance space. Advantageously, it comprises a coating treatment of the surface portion with a release agent.

The polymeric material is then introduced into the clearance space so as to contact the surfaces of the elements defining the clearance space and softened at least therein sufficiently for adhesion to any portion of the clearance-space surfaces of the elements which has not been arranged to prevent adhesion upon subsequent solidification thereof to form the resilient body resiliently coupling the elements. Advantageously, the polymeric material is introduced in a fluid state for conforming to the clearance-space surfaces as a forming die and solidifying in situ.

The solidified, resilient body of the polymeric material is then arranged by the die-forming clearance surfaces to couple the relative motion between the elements through the resilience of the material. In some embodiments, this arrangement for coupling the elements may be merely the physical presence of the resilient body. For example, if all the clearance-space surfaces of both elements are treated for non-adherence of the polymeric material when solidified into the resilient body, the resilient body may still couple relative motions between the elements via lateral surface friction and/or normal forces. In the preferred embodiments, however, only a portion of the die-forming surface of each element is treated for non-adherence and the resilient, polymeric-material body is thus adhered or bonded to the remaining portion to couple the elements adheringly.

Because only a portion of the surface is preferably treated to prevent adhesion of otherwise-bonding, resilient material, mobility is obtained over the other, adhered portion of the surface that is largely independent of the resilient body. The resilient body therefore is well adapted for guiding relative motion of the elements at least in a direction parallel to the unbonded surface portion. The surface portions treated to prevent adhesion may extend in any direction relative to that of the relative motion of the elements.

The bonding over the other surface portion also gives rise to a guide moment upon relative motion of the elements. The guide moment is independent of the guidance referred to above and may be perpendicular thereto. The bonding or adhesive zones may extend either parallel or at right angles to the directions of the relative motions, deviations of ±30° being of no real consequence.

With a parallel arrangement, no further finishing may be required since the machine part capable of relative motion is supported and guided respectively by the bonded and unbonded portions of the surface of the resilient body. The relative mobility also may be modified, however, by shrinking the polymeric material, for example as it solidifies into the resilient body and/or shaping the resilient body to obtain a clearance in the area opposite an unbonded surface portion. As a rule, the width of this clearance will be relatively small so that the desired guidance of the machine part capable of relative motion is retained. It will, however, prevent the adjacent element from making contact with the resilient body with the result that problems of static friction no longer arise. The exact dimensions will differ from case to case. It is of course also possible to shape either or both of the machine parts appropriately for spacing at least one from the resilient body instead of shrinking and/or subsequently shaping the resilient material.

In one advantageous embodiment, the clearance or spacing resulting from the shrinking of the resilient material and/or shaping of the machine part is filled with a substance having lubricating action and/or with a viscous liquid and/or with a pressurized medium. The relative mobility of the adjoining parts can thus be further modified. Of course, this particular embodiment of the method of the invention requires that the treatment for preventing adhesion of the resilient material be applied over portions of the surface of the machine part that are completely enclosed by adhered surface portions.

If the relative motion of the machine part is in a direction at right angles to its non-adherent surface portions, the free spaces between the resilient body and the machine part obtained by subsequent shaping of the machine part over that surface portion and/or shrinking the resilient body make the coupling a floating support, as it were, between opposite adhesive surfaces. Secondary guiding means thus are no longer required, even though production is greatly simplified.

BRIEF DESCRIPTION OF THE DRAWINGS

The invention will now be described in greater detail with reference to exemplary, but not limiting preferred embodiments shown in the accompanying drawings, wherein.

DESCRIPTION OF THE PREFERRED EMBODIMENTS

Figure 1:
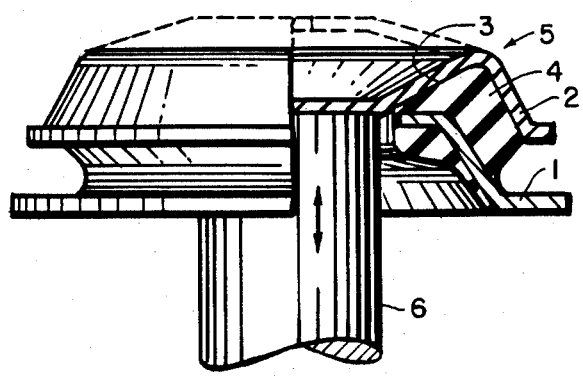
FIG. 1 is an elevation, half in section, of one, engine-mount embodiment.

In the process employed to produce the engine mount of FIG. 1, two machine parts 1 and 2 are used. These are inserted into a forming die (not shown) which completes an enclosure for polymeric material which, when solidified, forms a resilient body 4. Over the surface portion designated 3, the machine part 2 is coated with a release agent which prevents adhesion of the polymeric material during and thereby after its solidification.

The other portions of the machine parts 1,2 contacting the resilient body 4 are treated with an adhesion promoter. There the resilient material will bond well, in contrast to surface portion 3. For this, the polymeric material is introduced into the hollow, die space together with the machine parts 1, 2 or after these have been inserted, and is solidified after at least temporary softening in the die space.

The engine mount can then be removed from the die in the form shown and transferred to another tool, only exemplary punch 6 of which is shown. In the latter, the outer machine part 2 is axially secured by its outer periphery, for example along the circumferential edge 5, and its center pushed from the opposite side by the punch 6. The center portion of the upper machine part 2 thus is axially deformed and permanently transformed to the form shown by dashed lines, and hence axially separated from the resilient body 4 over the surface zone 3 which is coated with the release agent. The upper machine part 2 is thus coupled for axial deflection relative to machine part 1 through the resilient body 4 without influence by the surface 3. The part so obtained can be used as is for its intended engine-mounting purpose. The solid parts of hydraulic suspensions for internal-combustion engines can be produced in the same manner for other embodiments.

Figure 2:
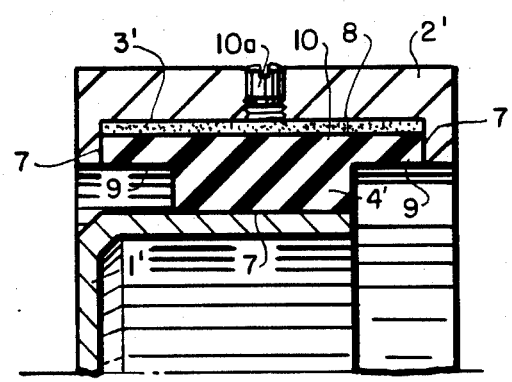
FIG. 2 is a sectional elevation of half another, torsional-vibration-damper embodiment.

The torsional-vibration damper of FIG. 2 can be obtained in the same way. Here, too, two, rotationally-symmetric, prepared machine parts 1' and 2' (only half shown) are inserted in a forming die which completes enclosure of a clearance space between the parts for the polymeric material for the resilient body 4', part 2' being coated with a release agent over surface portion 3'. The remaining die-forming surfaces 7 of the parts 1', 2' are coated with an adhesion agent.

The die-forming clearance space is then filled contactingly with the polymeric material for resilient body 4' which, after temporary liquification, solidifies in the die space and, along the adhesion-agent-coated surfaces 7, bonds to the adjacent machine parts 1' and 2'. Angular motion between parts 1' and 2' is thus transmitted only through the adhesive surfaces 7. The boundary surface 8 of the resilient body 4' is substantially unaffected thereby. Its correlation with the surface 3' of the outer machine part 2' which is coated with release agent thus remains substantially unchanged. As a result, the outer machine part 2' is effectively supported radially on the inner machine part 1'. Moreover, excellent axial support of the outer machine part 2' on the inner machine part 1' is provided by projections 9 which extend substantially only in the radial direction and thus act as floating supports.

The surfaces 3' and 8 are spaced apart due to different thermal shrinkage of the polymeric material used for the resilient body 4' and the outer machine part 2', the resilient material having been heated for liquification for filling the die space and adhesion to the surfaces 7. For improving the damping characteristics, silicone oil is then injected into the clearance 10 so formed through plug 10a. The clearance 10 is too thin to impair appreciably the radial guidance of the two machine parts 1', 2' on each other.

Figure 3:
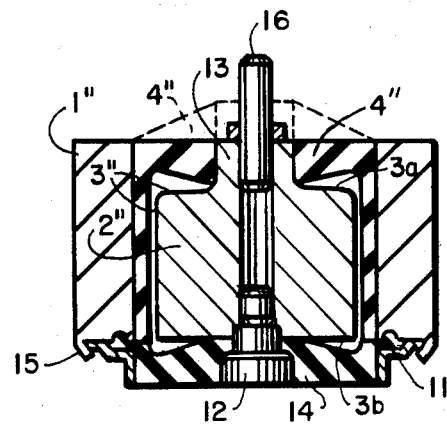
FIG. 3 is a sectional elevation of still another, longitudinal-vibration-damper embodiment.

In the production of the longitudinal-vibration damper shown in FIG. 3, substantially the same operations are employed as described above. However, production takes place in three successive steps.

In the first step, the part 2" is inserted into part 1" and a further die-completing structure (not shown) axially displaced upwardly as shown in phantom in FIG. 3. The end face 3a and axial surfaces of part 2" thus constitute the surface portion 3" which has been coated with a release agent. The end face 3a then, therefore, abuts squarely on the associated end face of the resilient body 4" formed with polymeric material in the die space. Part 2" therefore is unable to bond to the resilient body either over this end face 3a or over its outer periphery, except at the hub 13, but it is surrounded by the resilient body 4" so that there can be no metal-to-metal contact between the two parts 1" and 2".

In the second step, a separately-formed spring ring 14 of a resilient, polymeric material, for example rubber, is placed across the opposite end face 3b of part 2". The spring ring 14 rests on part 1" at its periphery. Clamp ring 11 engages the periphery of the spring ring 14 to reinforce it and, preferably, secure it to part 1" by inward crimps in a lip 15 about part 1".

In this embodiment, the spring ring 14 corresponds in shape to the resilient, polymeric body 4" at the opposite end face 3a of part 2". This produces a desirable axial symmetry in the completed resilient coupling between parts 1" and 2" to be described. For completing the coupling, the spring ring 14 centrally carries a sleeve 12.

Then, in the third step, the machine part 2" and sleeve 12 are bolted together axially with nut and bolt fastener 16. This axially displaces part 2" to the intermediate position shown relative to machine part 1". Machine part 2", made of a vibration-absorbing material, thus occupies the intermediate axial position between end-projections of resilient bodies 4" and 14, but is capable of moving axially to either side from the intermediate position, as well as radially, but only slightly across a narrow, shrinkage-formed clearance between ends 3a and 3b to maintain guidance.

In the embodiments of the process for the products described with reference to the Figures, die components close about the resilient body. In these embodiments, therefore, it is contemplated that the resilient, polymeric material is applied in a liquid condition and solidified in situ between the machine parts. Rubber is a suitable polymeric material for this, for example. stearates or waxes are then a suitable release agent for coating the surfaces which are not to adhere to the solidified, resilient, polymeric material and, if desired, formaldehyde latices or a solution of chlorinated rubber is suitable for coating surfaces such as surface 7 (FIG. 2) which are to adhere to the solidified, resilient, polymeric material. Other suitable resilient polymeric materials and corresponding release or non-adhering and adhering agents are known in the art.

In other embodiments, however, the resilient polymeric material may be a pre-shaped solid. It is then liquefied in situ sufficiently for the differential adherence and non-adherence described and then re-solidified, for example by heating the machine parts.

Selection of the materials depends on the resilience and other properties desired, the materials of the elements or machine parts to be resiliently coupled, the condition of the elements or machine parts in, for example, temperature and surface smoothness, and other, like factors. Specific materials will, therefore, suggest themselves to those in the art for specific applications from the teachings of the invention.

For example, some resilient, polymeric materials may themselves sufficiently adhere to the elements and thus require only a release agent. Others may not adhere and thus require only an adherence agent. Still others may adhere and not adhere in dependence on the materials or conditions, for example temperature, of the elements to require only selecting their respective materials or condition. The arts for selecting appropriate materials are, however, sufficiently developed that further specific examples are not required.

It will be appreciated that the instant specification and claims are set forth by way of illustration and not of limitation, and that the above and other various changes and modifications may be made without departing from the spirit and scope of the present invention.

What is claimed is:

1. A process for producing a resilient coupling in a clearance space between surfaces of two, relatively-movable elements with a polymeric material which forms a resilient body for the resilient coupling between the elements, the process comprising the steps of:
    introducing a polymeric material which forms a resilient body into a clearance space between surfaces of two, relatively-movable elements so as to contact at least a portion of the surface of each of the elements defining the clearance space;
    adhering the polymeric material to at least a portion of the contacted surface portion of each of the elements;
    arranging a portion of the contacted surface portion of at least one of the elements to prevent the adhesion of the polymeric material; and
    thereafter forming a clearance between the polymeric material and the surface portion of the at least one of the elements where the adhesion is prevented by shaping at least one of the elements, said polymeric material remaining unstressed in the region of said clearance after said clearance is formed.

2. The process of claim 1, wherein the adhering and arranging steps comprise softening the polymeric material at the contacted surface portions of each of the elements and, prior thereto, treating the contacted surface portion of the at least one element where arranged to prevent the adhesion with a release agent for preventing the adhesion of the softened polymeric material thereat when solidified and, thereafter, solidifying all of the softened polymeric material for the adhering.

3. The process of claim 2, wherein the solidifying step comprises solidifying the polymeric material adheringly to a portion of the one element which surrounds a portion of the same element where adhesion is prevented.

4. The process of claim 1, and further comprising filling the clearance with one of a lubricating substance, a viscous liquid, and a pressurized medium.

5. The process of claim 2, and further comprising filling the clearance with one of a lubricating substance, a viscous liquid, and a pressurized medium.

6. The process of claim 2, and further comprising, prior to the softening step, treating the surfaces for the adhesion with an agent which promotes the adhesion of the polymeric material to the surface.

7. The process of claim 3 and further comprising, prior to the softening step, treating the surfaces for the adhesion with an agent which promotes the adhesion of the polymeric material to the surface.

8. The process of claim 4, and further comprising, prior to the softening step, treating the surfaces for the adhesion with an agent which promotes the adhesion of the polymeric material to the surface.

9. The process of claim 5, and further comprising, prior to the softening step, treating the surfaces for the adhesion with an agent which promotes the adhesion of the polymeric material to the surface.

* * * * *